United States Patent [19]
Lawrence et al.

[11] Patent Number: 4,826,391
[45] Date of Patent: May 2, 1989

[54] MANIPULATOR ARM POSITION SENSING

[75] Inventors: Peter D. Lawrence; Alan K. Mackworth; Isobel J. Mulligen, all of Vancouver, Canada

[73] Assignee: The University of British Columbia, Canada

[21] Appl. No.: 158,732

[22] Filed: Feb. 23, 1988

[51] Int. Cl.⁴ ............................................. B66C 23/00
[52] U.S. Cl. ..................................... 414/698; 901/47; 414/699; 414/688
[58] Field of Search ...................... 901/15, 46, 47, 50, 901/9; 364/513; 37/DIG. 19; 33/1 N, 471, 472; 414/698, 699, 688

[56] References Cited

U.S. PATENT DOCUMENTS

| | | | |
|---|---|---|---|
| 4,412,206 | 10/1983 | Schwefel | 901/46 X |
| 4,453,085 | 6/1984 | Pryor | 901/47 X |
| 4,613,942 | 9/1986 | Chen | 901/47 X |
| 4,676,002 | 6/1987 | Slocum | 33/1 N X |
| 4,715,772 | 12/1987 | Kanayama | 901/9 X |
| 4,753,569 | 6/1988 | Pryor | 901/9 X |
| 4,776,750 | 10/1988 | Griswald, Jr. et al. | 414/699 X |

FOREIGN PATENT DOCUMENTS

| | | | |
|---|---|---|---|
| 0055915 | 7/1982 | European Pat. Off. | 901/9 |
| 2430058 | 1/1976 | Fed. Rep. of Germany | 901/47 |
| 3414771 | 10/1984 | Fed. Rep. of Germany | 37/DIG. 19 |
| 0171580 | 9/1985 | Japan | 901/47 |

OTHER PUBLICATIONS

Hildreth, Ellen C., "Edge Detection for Computer Vision System", *Mechanical Engineering*, Aug., 1982, pp. 48–53.
End-Point Control of a Folding Arm Crane, Skogsarbeten, Bjorn Lofgren, 1986-09-29.

*Primary Examiner*—Frank E. Werner
*Assistant Examiner*—William M. Hienz

[57] ABSTRACT

An apparatus determining relative positions of arm elements of a manipulator having at least two relatively moveable arm segments uses image analysis and a model of the manipulator to analyze an image of the two arms to determine the joint angles between adjacent arms.

4 Claims, 3 Drawing Sheets

MANIPULATOR ARM POSITION SENSING

FIELD OF THE INVENTION

The present invention relates to position sensing, more particularly the present invention provides a system of determining joint angles by image analysis.

BACKGROUND OF THE PRESENT INVENTION

In the operation of robotic systems particularly manipulators having articulated joints it is generally the practice to use joint angle sensors such as encoders or resolvers to determine the relative angular displacement between a pair of pivotably interconnected arms.

Obviously such joint angle sensors are subject to failure as is in the other detecting system including the one which is described here below. However, as man becomes more and more dependent on the operation of these sensors to handle relatively large machinery, a backup system to ensure the accurate operation of the sensor or an alternate system for determining the relative angular relationship between a pair of interconnected joints is of value.

BRIEF DESCRIPTION OF THE PRESENT INVENTION

It is an object of the present invention to provide a joint angle sensing system for articulated manipulators wherein the joint angle is determined by image analysis.

The present invention is of particular value in an installation where a camera will be used and some cases will justify the addition of a camera in an appropriate location on the system to provide a measure of the angular displacement.

Broadly the present invention relates to a method or apparatus for determining the relative positions of articulated elements of a manipulator having at least two relatively moveable arm segments each of which is provided with a marker means comprising camera means for providing an instantaneous representation of at least said marker means to provide an image in which said marker means can be discerned, means for analyzing said image to determine relative positions of said arms based on the relative position of said marker means in said image.

Preferably the image analysis means will commence analysis by first locating an arm segment adjacent one end of the articulated arm and then positioning the remainder of the articulated arm segments relative to the first arm segment.

Preferably the present invention will comprise a camera mounted on a cab and adapted to generate images that will allow recognition of the various arm segments, discriminating preselected portions on each of said arm segments by analysis of said image determining the orientation of said preselected portion and determining the angular relationship of said articulated arm segments based on the orientation of said preselected portions.

BRIEF DESCRIPTION OF THE DRAWINGS

Further features, objects and advantages will be evident in the following detailed description of the preferred embodiments of the present invention taken in conjunction with the accompanying drawings, in which.

DESCRIPTION OF THE PREFERRED EMBODIMENTS

Figure 1:
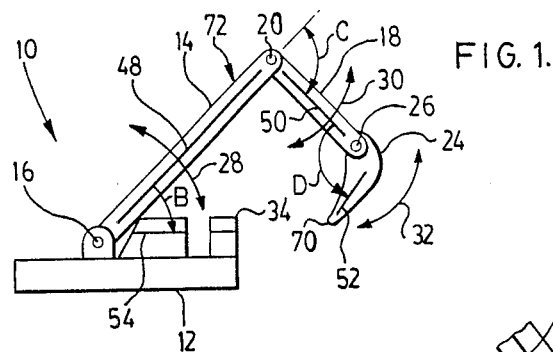
FIG. 1 is a schematic side elevation of an excavator incorporating the present invention.

As shown in FIG. 1 an excavator or the like generally indicated schematically at 10 is composed of a base 12 having a first arm segment or boom 14 pivotally mounted thereon for rotation around the axis 16. A second arm segment or stick 18 is pivotally connected to the free end of the boom 14 for movement around the axis 20 and a bucket 24 is in turn pivotally connected to the free end of the arm 18 for pivotal movement around the axis 26. In the illustrated arrangement the axes 16, 20 and 26 are parallel.

Equipment for pivotally moving the boom 14 around axis 16 is schematically indicated by the arrow 28 and drive means for moving this stick 18 around the axis 20 is indicated by the arrow 30 and the drive means for moving the bucket 24 around the pivot 26 is schematically indicated by the arrow 32.

The angular displacement of the boom 14 to the base 12 is indicated by the angle B while the angular displacement between the stick 18 and boom 14 is indicated by the angle C and the angular displacement of the bucket 24 to the stick 18, i.e. the longitudinal axis of the stick 18 is indicated by the angle D.

A camera 34 is suitably positioned on the base 12 to photograph at least the boom 14 and stick 18 and may also include the bucket 24. This camera 34 as well as the boom 14, etc are all mounted on the base 12 which in turn is pivotal on axis 36 to be rotated by suitable drive means as schematically indicated by the arrow 38. The axis 36 is perpendicular to the axes 16, 20 and 26.

Figure 2:
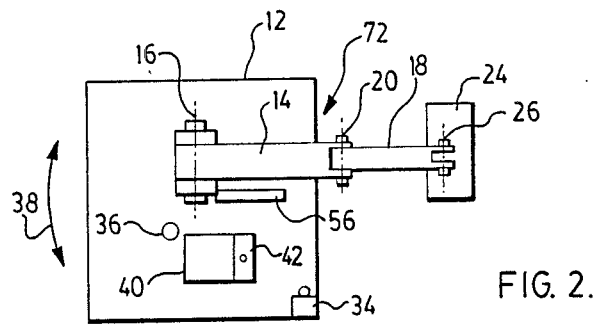
FIG. 2 is a schematic plan view of the excavator of FIG. 1.

Normally an operator will be positioned in the operator's position as indicated at 40 and will control the operation of the boom 14 and stick 18 and bucket 24 via a suitable control such as that schematically indicated at 42 (FIG. 2).

Figure 3:
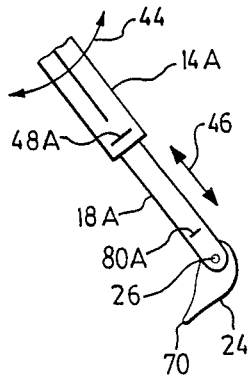
FIG. 3 is a modified excavator wherein the second joint a sliding rather than pivoting joint.

A second embodiment of the present invention is indicated in FIG. 3 wherein the arm segment 14A is pivotally mounted to the base 12 generally at an elevation higher than the pivot 16 and is pivoted around its pivotal connection by a means schematically represented by the arrow 44 essentially equivalent to the means represented by the arrow 28.

The stick in the FIG. 3 embodiment is generally indicated at 18A and is moved in the direction of the arrow 46 axially of the boom 14A by a power means schematically represented by the arrow 46. A suitable bucket such as the bucket 24 is mounted at the free end of the stick 18A in the same manner as the bucket 24 on the free end of the arm or stick 18 of the FIG. 1 and 2 embodiments.

To facilitate discrimination of the longitudinal axis or a selected axis on each of the articulated arm segments 14, 18 and 24 respectively there is provided in the FIG. 1 embodiment axial markings 48, 50 and 52 respectively. Similarly the base 12 may be provided with a suitable marking 54 located within view of the camera and positioned adjacent of the pivotal axis 16 on a stand or the like 56. Such a marking 54 and stand 56 are not necessary as the orientation of the camera may be aligned with the base so that this reference line 54 which is really a reference line parallel to the base 12 is not essential.

In a preferred system as will be described in more detail hereinbelow edges of the arms segments 14, 18 and 24 may be discriminated in the image analysis system and used to provide the markers equivalent of the markers 48, 50 and 52, i.e. preselected edges of the arm segments themselves may function as the markers. The markers may become dirty or obscured and thus it is better to use a portion of or one or more edges of the arm segments as the marking.

Figure 4:
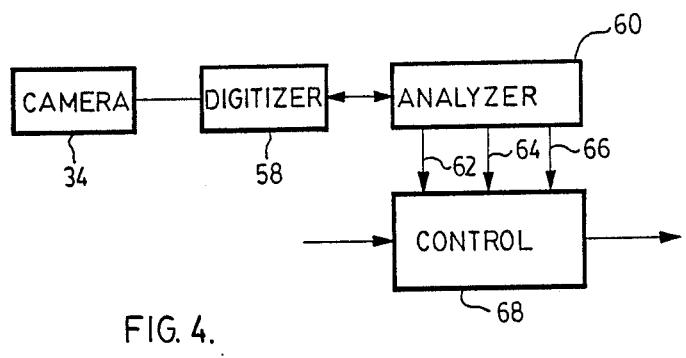
FIG. 4 is a schematic representation of the image analysis system of the present invention.

Generally, the system will operate as schematically indicated in FIG. 4. The camera 34 will take the picture which will be digitized by the digitizer as indicated at 58 and then this digitized image generated in the digitizer 58 will be analyzed in the analyzer 60 and the various angles B, C and D will be determined by comparing the orientation of the markers (edges of the arm segments) with the model of the arm in memory. This information is fed as indicated by the arrows 62, 64 and 66 into a computer control 68 to provide the computer control with the then current values for the angles B, C and D.

Obviously if the bucket 26 is intended to move out of sight in operation, this system will not be usable for the bucket 26. However in many applications only the angles B and C are required. In some other equipment the bucket 26 will be replaced with for example a feller buncher, grapple or the like that will substantially always be in view of the camera 34 and its orientation determined.

In the FIG. 3 embodiment the extension of the arm segment 18 may be measured by image analysis to locate the markers 48A and 50A and determine their spacing and thereby the extension of arm segments 18A relative to arm segment 14A.

The excavator in the illustrated example (FIGS. 1 and 2) has four joints formed by the rotating cab or base 12 on a frame (not shown) and rotation of the boom 14, stick 18 and bucket 24. The angle of the boom (angle B), the angle between the boom and the stick (angle C) and angle D and endpoint 70 (FIGS. 1 and 3) of the bucket may for example be determined. The global constraints on the joints permit the system to locate the boom first (angle B) then the stick relative to it (angle C) and if desired the bucket relative to the stick (angle D). The same process can be applied to any multi-link manipulator.

Starting with an image of the manipulator arm 72 which includes boom 14, stick 18 and bucket 24 from a camera mounted in the cab or base 12 the image features are extracted which allows recognition of its various arm segments 14, 18 and 24 or if markings are present the marking 48, 60 and 52.

Figure 5:
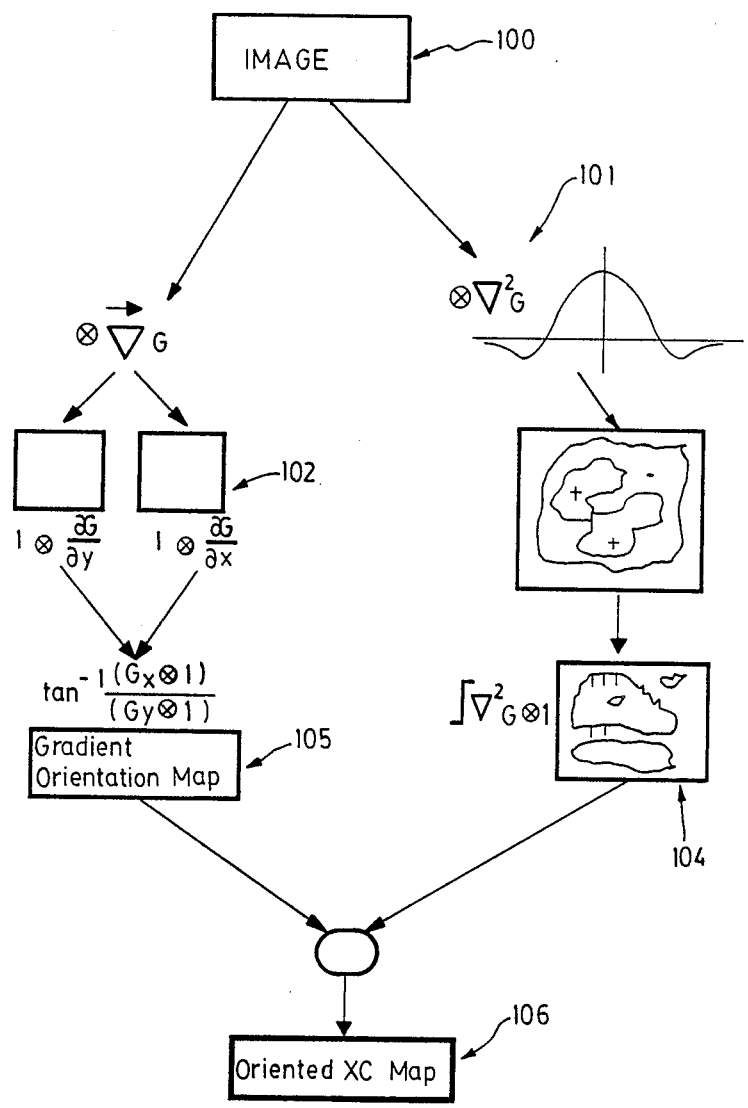
FIG. 5 is a schematic representation of image analysis to produce a gradient orientated map.

As shown in FIG. 5 the image 100 is separately convolved with the Laplacian of the Gaussian 101 and smoothed x- and y- directional operators 102 and 103 respectively. The zero crossings in the $\nabla^2 G$ image 104 are located and marked with the gradient direction 105:

$$\arctan\left(\frac{\frac{\partial(G \otimes I)}{\partial x}}{\frac{\partial(G \otimes I)}{\partial y}}\right)$$

where
G = Gaussian
$\otimes$ = convolution
I = image intensity function

The result is an oriented zero crossing map 106.

Figure 6:
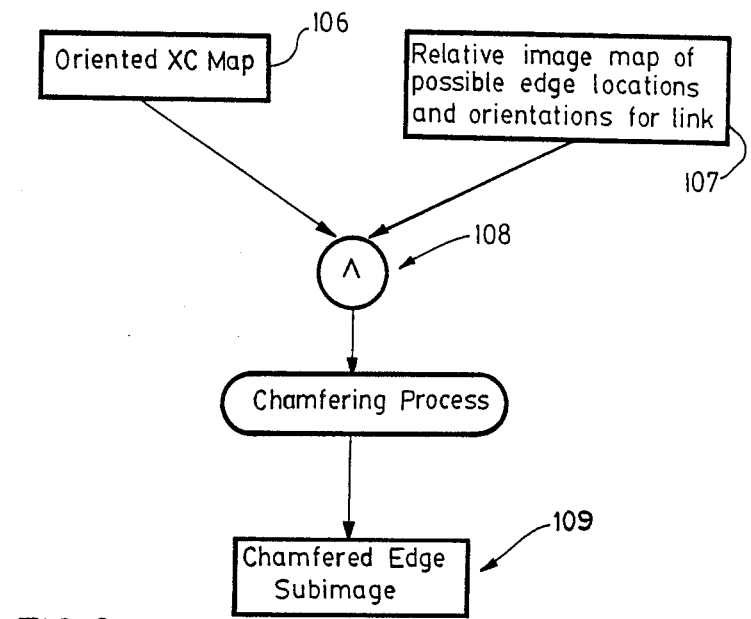
FIG. 6 is a schematic illustration of the process used for determining a chamfered edge in an image.

The appearance of the manipulator arm in the image is highly constrained; for example, the edges of the boom may only appear at certain orientations in the upper right corner of the image. As shown in FIG. 6 for each arm segment a map of a range of valid orientations for edge points appearing at each pixel location can be precomputed 107. The origin of this map is relative to the image location of a point on the axis of rotation of the arm segment in question. If edge elements from the oriented zero crossing map fall within the valid range for the current arm segment, they are retained, otherwise they are discarded as irrelevant. The resulting image 108 contains only edge points highly likely to fall on the current arm segment. This process may be facilitated when markings 48, 50 and 52 are employed and the markings are being located rather than edges.

Figure 7:
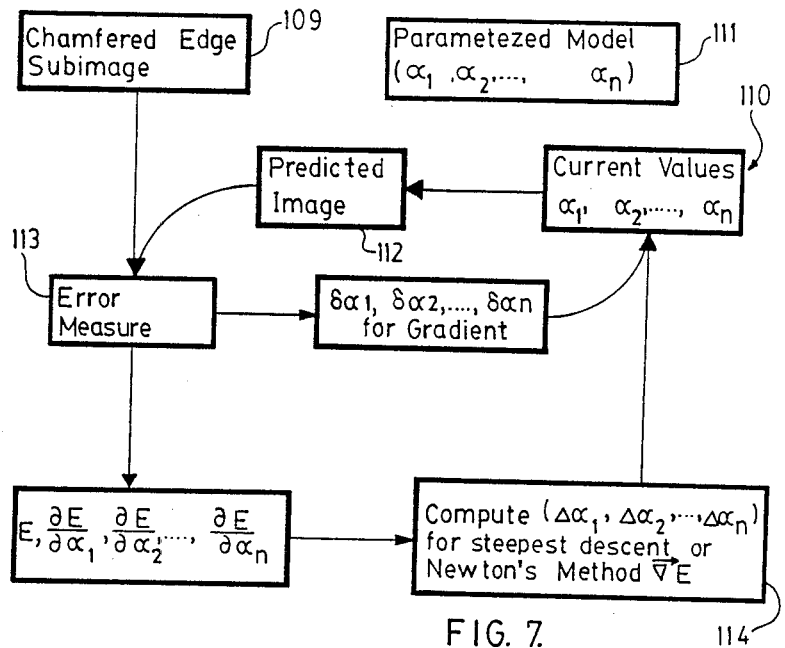
FIG. 7 is a schematic representation of determination of the angle as would be determined for each arm segment.

The improved edge subimage is then chamfered as indicated at 109, a parallel process which marks each pixel point with an estimate of its distance from the nearest edge point. As shown in FIG. 7, using an estimate of the joint angle as indicated at 110, the edge based model 111 for the current arm segment to provide a predicted image 112 that can be projected into the chamfered subimage. The edge base model 111 is based on the preprogrammed position of, in the example, the adjacent top edge of each arm segment and its two bottom edges. Summing the distance values of the pixels where the projected edges fall gives an error measure E as indicated at 113 of how far projected model lines from model 111 are from observed image edges. Gradient descent techniques 114 based on analysis-by-synthesis are then used, repeatedly adjusting the current joint angle and computing the new error measure to minimize the error and determine the optimal joint angle estimate.

Once the first arm segment 14 is located, the subimage of interest for the next arm segment 18 can be determined and so on until all of the joint angles are known, i.e. the procedure of FIGS. 6 and 7 is repeated for each arm segment namely segments 14, 18 and 24 in the illustrated embodiment.

Having described the invention modifications will be evident to those skilled in the art without departing from the spirit of the invention as defined in the appended claims.

We claim:

1. A manipulator incorporating a system for determining relative positions of arm segments of its manipulator arm comprising a manipulator having a base pivoted for rotational movement around a first axis, a manipulator arm having a first and a second arm segment, said first arm segment pivotally mounted on said base about a second axis and said second arm segment pivotally connected to said first arm segment about a third axis located adjacent an end of sid first arm segment remote from said second axis, said second and third axes being substantially parallel and substantially perpendicular to said first axis, camera means mounted on said base in fixed relation to said first and second axes and including in its field of view said first and second arm segments in substantially all their positions of movement, said camera means acquiring representations of each of said first and second arm segments to provide image data, computer means receiving said image data, said computer means extracting image features from said data representative of said first and second arm segments, said computer means including an articulated model of said manipulator arm in its various positions and comparing said image data with said model to determine the relative positions of said arm segments, wherein said computer means generates an arm segment map of the location of said first and second arm segments and said extraction of image data includes determining edge points in said image, said computer comparing said edge points with said arm segment map and retaining only those edge points likely to form an edge on said arm segment map.

2. A manipulator as defined in claim 1 wherein said computer means further comprises means to sequentially compare said image data with said model to determine the position of said first arm segment and then of said second arm segment.

3. A manipulator as defined in claim 1 wherein said computer means determines the difference between said model and said image data to determine the difference in the position of said manipulator in said model and in said image data.

4. A manipulator as defined in claim 2 wherein said computer means determines the difference between said model and said image data to determine the difference in the position of said manipulator in said model and in said image data.

* * * * *